US010166507B2

(12) United States Patent
Smyrniotis et al.

(10) Patent No.: US 10,166,507 B2
(45) Date of Patent: Jan. 1, 2019

(54) PROCESS FOR HYDROCHLORIC ACID MEDIATION

(71) Applicant: Fuel Tech, Inc., Warrenville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: Fuel Tech, Inc., Warrenville, IL (US)

( * ) Notice: Subject to any disclaimer, the term of this patent is extended or adjusted under 35 U.S.C. 154(b) by 0 days.

(21) Appl. No.: 15/162,882

(22) Filed: May 24, 2016

(65) Prior Publication Data

US 2016/0263521 A1    Sep. 15, 2016

Related U.S. Application Data

(63) Continuation-in-part of application No. 14/578,828, filed on Dec. 22, 2014, now Pat. No. 9,802,154, which is a continuation of application No. 13/873,668, filed on Apr. 30, 2013, now Pat. No. 8,992,868, and a continuation-in-part of application
(Continued)

(51) Int. Cl.
*B01D 53/68* (2006.01)
*B01D 53/86* (2006.01)
*B01D 53/79* (2006.01)
*B01D 53/75* (2006.01)

(52) U.S. Cl.
CPC .............. *B01D 53/68* (2013.01); *B01D 53/75* (2013.01); *B01D 53/79* (2013.01); *B01D 2251/60* (2013.01); *B01D 2251/606* (2013.01); *B01D 2251/80* (2013.01); *B01D 2257/2045* (2013.01);
(Continued)

(58) Field of Classification Search
CPC .. B01D 53/68; B01D 53/685; B01D 53/8659; B01D 2257/0204; B01D 2257/2045; B01D 2258/0283; B01D 2258/0291
See application file for complete search history.

(56) References Cited

U.S. PATENT DOCUMENTS

2004/0107833 A1*  6/2004  Sweeney ............ B01D 53/0407
                                                                 95/116
2010/0317509 A1* 12/2010  Wang .................... B01D 53/02
                                                                 502/62
(Continued)

*Primary Examiner* — Timothy C Vanoy
(74) *Attorney, Agent, or Firm* — Thaddius J. Carvis

(57) ABSTRACT

The invention relates to processes for reducing emissions of hydrochloric acid (HCl) to moderate pollution to the environment and achieve regulatory compliance in a cost-effective manner. In embodiments described below, the invention deals with reducing HCl and does not require a sorbent but utilizes an aqueous composition we term a copper-bearing chloride remediator (CBCR). In one general case, the CBCR can be a member selected from the group consisting of compositions defined by the formula $Cu(NH_3)_x$(carbonate or lower carboxylate)$_y$, wherein the lower carboxylate is selected from the group consisting of formate, acetate and propionate, x is an integer from 0 to 4, y is an integer from 0 to 2, and x+y is equal to or greater than 1.

12 Claims, 1 Drawing Sheet

Related U.S. Application Data

No. 13/854,361, filed on Apr. 1, 2013, now Pat. No. 8,916,120, application No. 15/162,882, which is a continuation-in-part of application No. 14/190,789, filed on Feb. 26, 2014, now abandoned.

(60) Provisional application No. 61/641,055, filed on May 1, 2012, provisional application No. 61/618,233, filed on Mar. 30, 2012.

(52) U.S. Cl.
CPC ............... *B01D 2258/0283* (2013.01); *B01D 2258/0291* (2013.01)

(56) References Cited

U.S. PATENT DOCUMENTS

| | | | | |
|---|---|---|---|---|
| 2011/0123422 A1* | 5/2011 | Wang | ................... | B01D 53/025 423/240 S |
| 2014/0241970 A1* | 8/2014 | Smyrniotis | ............ | B01D 53/68 423/240 R |

* cited by examiner

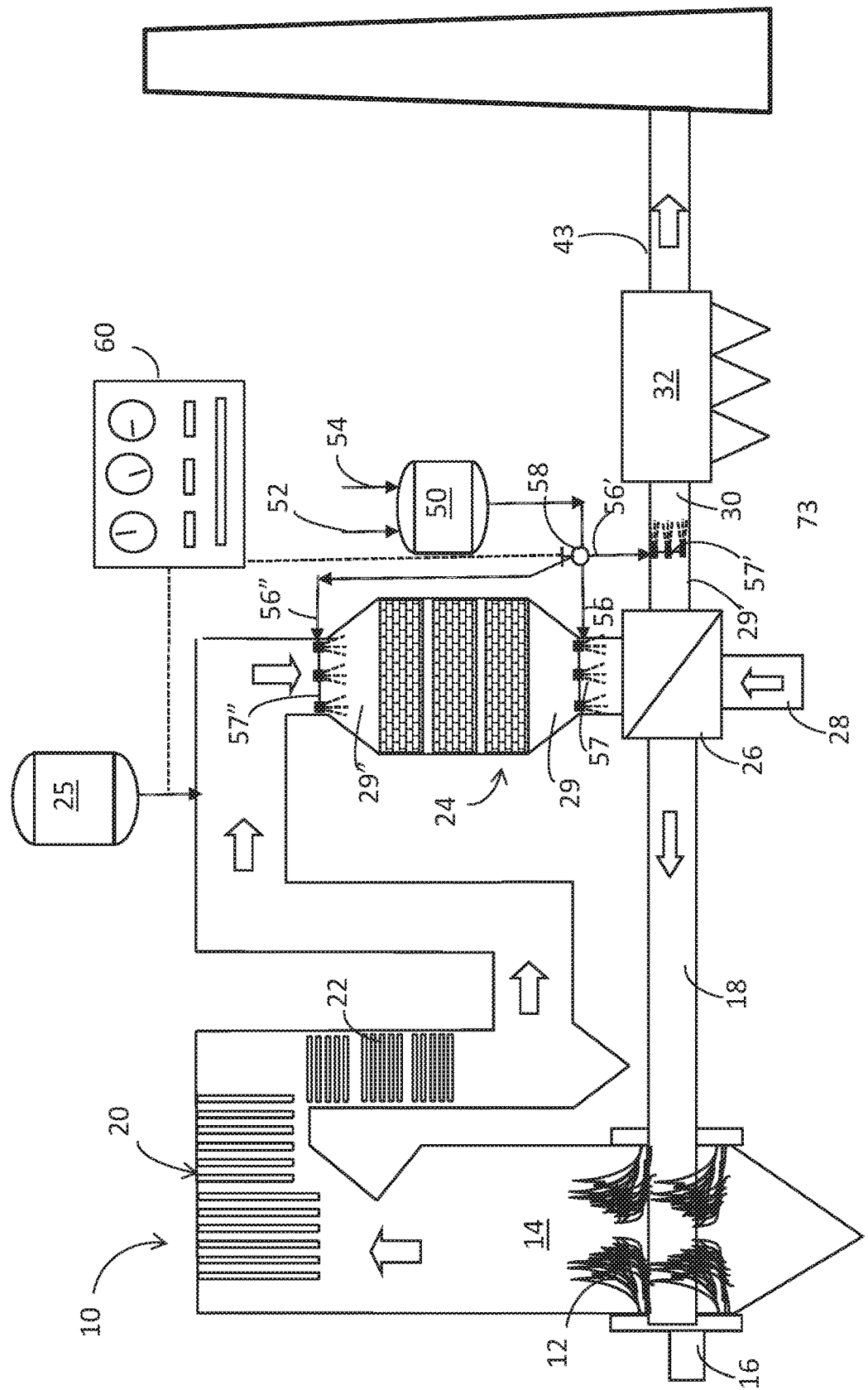

PROCESS FOR HYDROCHLORIC ACID MEDIATION

CROSS REFERENCE AND PRIORITY CLAIM

This application is a continuation-in-part of U.S. patent application Ser. No. 14/190,789, filed Feb. 26, 2014, U.S. patent application Ser. No. 14/578,828, filed Dec. 22, 2014, U.S. patent application Ser. No. 13/854,361, filed Apr. 1, 2013, and Ser. No. 13/873,668, filed Apr. 30, 2013, and claims priority to U.S. Provisional Patent Applications No. 61/618233, filed Mar. 30, 2012, and No. 61/641,055, filed May 1, 2012, the disclosures of which are hereby incorporated herein by reference in their entireties.

FIELD OF THE INVENTION

The invention relates to processes for reducing emissions of hydrochloric acid (HCl) to moderate pollution to the environment and achieve regulatory compliance in a cost-effective manner. In embodiments described below, the invention deals with reducing HCl and does not require a sorbent but utilizes an aqueous composition we term a copper-bearing chloride remediator (CBCR).

BACKGROUND OF THE INVENTION

The problems of acidic and toxic emissions, including sulfur oxides, HCl and mercury, have challenged combustion plant operators and regulators since there became an awareness of the harmful effects of acid rain. Sulfur oxides and nitrogen oxides are formed during the combustion of sulfur-containing carbonaceous fuels and their remediation has been subjects of intensive engineering and development over the years. Advances made have provided significant improvements in air quality. The technologies for addressing sulfur oxides and nitrogen oxides, however, don't always fully treat HCl emissions or control the problems HCl can pose with regard to corrosion, scrubber operation or waste water treatment.

HCl can cause a number of problems for wet scrubbers, and applicants have addressed these problems in U.S. patent application Ser. No. 14/190,900, filed Feb. 26, 2014, the disclosure of which is incorporated by reference in its entirety. The present invention deals with the control of HCl more generally and is not limited to the problems of wet scrubbers.

There is a present need for technology that can improve on the reduction of HCl in a highly effective and economical manner.

SUMMARY OF THE INVENTION

The present invention provides processes, apparatus, compositions and systems that will have a very positive effect on air quality by enabling reduction of HCl emissions at a very reasonable cost. The invention can be employed as a retrofit solution to existing plants and can be used in design of new plants.

In embodiments, the invention provides a process for reducing the chloride content in a gas stream to reduce the amount of chlorides in it, comprising: introducing a copper bearing chloride remediator composition in aqueous form into contact with combustion gases within a defined introduction zone under conditions effective for HO emissions control; and passing the gases from the introduction zone to a particulate recovery device to provide a reduced chloride gas stream.

In some embodiments a copper-bearing chloride remediator (CBCR) will comprise at least one copper composition selected from the group consisting of copper amine carboxylates, for example: copper carbonate, copper ammonium carbonate complexes, copper ammonium acetate, copper diammonium diacetate, copper ammonium triacetate, copper triammonium acetate, copper tetra ammonium sulfate, copper gluconate (and hydrates thereof), and mixtures of any of these.

From another perspective, the copper bearing chloride remediation composition can be a member selected from the group consisting of compositions defined by the formula $Cu(NH_3)_x(\text{carbonate or lower carboxylate})_y$, wherein the lower carboxylate is selected from the group consisting of formate, acetate and propionate, x is an integer from 0 to 4, y is an integer from 0 to 2, and x+y is equal to or greater than 1.

In embodiments of the invention, CBCR comprises an aqueous copper ammonium carbonate complex of copper carbonate and ammonia or ammonium carbonate, or an aqueous cuprammonium lower carboxylate complex of copper lower carboxylate and ammonium lower carboxylate.

In embodiments the CBCR will comprise an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments the CBCR is injected by injection means comprising a plurality of nozzles within an introduction zone, and the nozzles are positioned to achieve at least 90% coverage within the introduction zone.

Other preferred aspects and their advantages are set out in the description which follows.

BRIEF DESCRIPTION OF THE DRAWINGS

The invention will be better understood and its advantages will become more apparent when the following detailed description is read in conjunction with the accompanying drawings, in which:

FIG. 1 is a flow diagram of one embodiment of the invention.

DETAILED DESCRIPTION OF THE INVENTION

Reference will first be made to FIG. 1, which is a flow diagram of one embodiment of the invention, which is employed to reduce the HCl content of the gases resulting from combustion or pyrolysis. The illustrated combustion installation includes a combustor 10 having burners in a combustion zone 12 that provide thermal heat in combustion zone 14 by burning fuel from a source 16 with air supplied by duct work 18.

Any conventional fuel from fossil fuels (e.g., oil, coal and/or gas to biomass (e.g., vegetative waste or dedicated growth) and refuse (e.g., domestic and industrial wastes having suitable BTU values) can be employed alone or as a blend. It is an advantage of the invention that coal that is high in chloride and sulfur can be combusted with the resulting pollutants, such as HCl emissions, selectively reduced relative to $SO_x$. It will be understood that the principals of the invention can be applied to other carbonaceous fuels and fuel mixtures (any other fuel of choice, typically a carbonaceous thermal fuel or refuse). Biomass is interesting, especially as a blending component, because it is considered environmentally friendly; however, it can have significant chloride contents. For the context of this discussion, biomass is used to describe waste products and dedicated energy crops. Waste products include wood waste material (e.g., saw dust, wood chips, etc.), crop residues (e.g., corn husks, wheat chaff, etc.), and municipal, animal and industrial wastes (e.g., sewage sludge, manure, etc.). Dedicated energy crops, including short-rotation woody crops like hard wood trees and herbaceous crops like switch grass, are agricultural crops that are solely grown for use as biomass fuels. These crops have very fast growth rates and can therefore be used as a regular supply of fuel. It is an advantage of the invention that biomass and refuse having relatively high chlorine contents, e.g., above 0.1 percent, can be effectively blended with higher sulfur coals to take advantage of their low sulfur content to offset the sulfur in the coal without detrimentally affecting the operation of a wet scrubber.

Hot combustion gases flow through the upper portion of combustor 10 as indicated by the block arrows, then flow past heat exchangers shown in various sections, from 20 to 22, which transfer heat from the combustion gases to water or steam for the generation of steam or super-heated steam. Other configurations may also be employed as dictated by the design of a particular boiler. Air for combustion, supplied by line 28, is typically preheated as noted by gas-to-gas heat exchanger 26 which transfers heat from ductwork at the exit end of the combustion equipment, e.g., downstream of heat exchange sections 20 and 22, where useful thermal energy is recovered from the combustor.

Following heat exchangers 20 and 22 the combustion gases may be passed into a selective catalytic reduction (SCR) reactor 24 wherein $NO_x$ created during combustion can be treated with ammonia or gasified urea (including ammonia and HNCO), which can be supplied from storage tank 25 or the like, to convert the $NO_x$ to nitrogen and water. Alternatively, many installations will benefit from selective non catalytic reduction (SNCR) using urea alone at higher temperatures, e.g., as taught by Epperly, et al., in U.S. Pat. No. 5,057,293, without requiring the reactor 24.

Following SCR reactor 24, the combustion gases will flow through an air-to-air heat exchanger 26. The combustion gases leaving the heat exchanger 26 are cooled significantly by the time they are passed through duct work 30 to a particulate recovery device 32, which can be electrostatic precipitator (ESP), baghouse or other like suitable device. Particulate recovery device 32 collects particulates prior to passing the gases through a wet scrubber 40 for discharge to a stack, not shown. The temperature of the gases leading to the SCR reactor will be at a temperature suitable for the SCR reaction, e.g., a temperature within the range of from about 500° to about 1000° F. And, the temperature following the SCR and prior to the particulate recovery device 32, e.g., in lines 29 to 30, will typically be within the range of from about 250° F. to about 1000° F. Of course, not all embodiments will include a SCR unit, and these embodiments will generally encounter the same temperatures upstream of the particulate recovery device 32.

The invention captures gaseous chlorides from the combustion gases and converts them into a solid form, which is enabled by introducing a copper bearing chloride remediator (CBCR) composition in aqueous form into contact with combustion gases to react with the HCl in the gases to convert it to a solid, recoverable form; passing the gases to a particulate recovery device 32 to collect solids including copper chlorides.

It has been discovered that a group of highly-active copper compositions are effective for remediating HCl in the combustion gases and can be employed as water-borne chemicals for introduction into a flue gas to be treated. The copper compositions effective for HCl control are referred to as a group according to the invention as copper-bearing chloride remediators (CBCRs). Significantly, these compositions are not so/bents that collect pollutants and survive passage though the combustor for collection downstream. The CBCRs identified by the invention do not survive hut are chemically altered and are believed to react with the HCl and other chlorides. As used in this description, the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding. It is believed that some of the CBCRs are chemical complexes. The term "aqueous composition" means any such composition with water and can be in any form, such as a solution, a suspension or a slurry.

In embodiments the CBCR is introduced in aqueous form, supplied, e.g., from tank 50, within a defined introduction zone under defined conditions before the gases are cooled to below about 400° F. In embodiments, the introduction zone is designed to provide sufficient reaction time to react with the HCl in the gases in duct 29 and/or 30 to react with it and convert it to recoverable solid form. The gases are then passed to the particulate recovery device 32 to provide a reduced chloride gas stream.

The CBCR will be introduced to reduce HCl and the process can include steps of monitoring the HCl concentration of the combustion gases prior to the defined zone (e.g., duct segments 29, 29' and 29") and following the defined zone, wherein the temperature is less than 1000° F., preferably within the range of from about 250° to about 900° F. In this regard, introduction of the CBCR into duct segment 29", just ahead of an optional SCR unit, can be advantageous in units employing them because the gases at this point are consistently at a temperature suitable for SCR reactors and the duct segment 29" will typically have an enlarged section where the velocity of the gas is reduced prior to entry into the SCR reactor 24.

In one aspect, the CBCR will comprise at least one water-soluble or water-dispersible copper composition which is believed to form copper oxides when heated in situ by the flue gases being treated. Specifically referenced compositions are those described in U.S. Pat. No. 4,020,180 as comprising an aqueous cupramine lower carboxylate complex of copper lower carboxylate and amine-containing lower carboxylate. Desirably in accord with U.S. Pat. No. 4,020,180, the complex can contain weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4 In U.S. Pat. No. 4,020,180, the claimed composition is interchangeably referred to as "cuprammonia acetate complex" and "cuprammonium lower carboxylate complex." At the time the patent states that the structure of the product was not determined, but was believed that the reaction product had a formula $Cu(NH_3)_x(\text{carbonate or lower carboxylate})_y$, wherein the lower carboxylate is selected from the group consisting of formate, acetate and propionate, x is an integer from 0 to 4, y is an integer from 0 to 2, and x+y is equal to or greater than 1. Our structural investigation of the composition claimed in U.S. Pat. No. 4,020,180 indicates that the nitrogen-containing groups that are bonded to copper are ammonia ($NH_3$) groups; however, for consistency with the patent, we use the same nomenclature used in U.S. Pat. No. 4,020,180 and refer to the compound as "cuprammonium lower carboxylate."

In embodiments, CBCRs according to the invention are highly soluble or dispersible in water and react with the hot combustion gases to result in compositions chemically different from when contacted with the combustion gases. Desirably, CBCRs include copper compositions that have copper that can be released in an active form at the temperatures involved to form a reactive copper entity. Introduction of the CBCR into elevated temperatures results in decomposition to the reactive copper entity. The CBCR decomposes to elemental copper, $Cu_2O$, and CuO.

Among the CBCRs of interest to the invention are compositions that comprise copper and an ammonia moiety. Among these are amine-containing copper compositions, including those having one or more copper atoms with one or more nitrogen-containing moieties. Water solubility or dispersibility is important because introducing them with water has been shown to be a highly-effective manner of achieving the necessary distribution followed by dissociation. Chemical dispersants and agitation can be employed as necessary.

In embodiments of the invention, the CBCRs will comprise a copper composition selected from the group consisting of copper carbonate, copper ammonium carbonate, copper acetate, copper ammine acetate, copper diamine diacetate, copper amine triacetate, copper triamine acetate, copper tetraamine sulfate, copper gluconate (and hydrates thereof), and mixtures of any of these. From another perspective, the copper-bearing chloride remediator can be a member selected from the group consisting of compositions defined by the formula $Cu(NH_3)_x$(carbonate or lower carboxylate)$_y$, wherein the lower carboxylate is selected from the group consisting of formate, acetate and propionate, x is an integer from 0 to 4, y is an integer from 0 to 2, and x+y is equal to or greater than 1. In embodiments the CBCR can comprise a copper ammonium complex having an empirical formula of $CH_6CuN_2O_3$ or $C_2H_7CuNO_2$.

Closely related compositions and their hydrates as well as other copper sources that exhibit similar efficacies in reacting with HCl can be employed. Copper compositions that contain no nitrogen-containing moiety, can be employed. If desired, these compositions can optionally be supplemented with a compound related to ammonia, such as a result of processing (e.g., for NO reduction) or by supplementation as desired with ammonia or urea or other material effective to produce ammonia at the temperatures involved, as well as compounds equivalent in effect, e.g., amines and their salts, urea breakdown products, amine salts of organic and inorganic acids, ammonium carbamate, biuret, ammelide, ammeline, ammonium cyanate, ammonium carbonate, ammonium bicarbonate; triuret, cyanuric acid; isocyanic acid; urea formaldehyde; melamine; tricyanourea and mixtures and equivalents of any number of these.

Among CBCRs not containing an nitrogen-containing moiety are copper carbonate, copper carbonate basic, copper acetylacetonate (and hydrates thereof), copper citrate (and hydrates thereof, e.g., hemipentahydrate), copper formate (and hydrates thereof), copper acetate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, other saponifications, chelated copper compounds and mixtures of any of these.

Reference is again made to FIG. 1, which depicts a mixing stage 50 provided to prepare an aqueous treatment agent containing water supplied via line 52 and one or more CBCRs supplied via line 54. The vessel 50 can be agitated as necessary. The relative amounts of the materials and water can be controlled by a suitable controller 60, or batching and feed of the CBCRs can be achieved manually. Dotted lines in the drawings schematically designate control lines for proper communication between the various controlled lines and valves and the controller 60.

The CBCR will typically be supplied in aqueous form, containing from 60 to 99.8% water, with a narrower range being from about 70 to about 95%. These and other percentages given in this application are based on weight. The CBCR can be introduced via line 56, 56' and/or 56" to nozzle arrays 57, 57' and/or 57", respectively, depending on measured temperatures to introduce it into the defined zone, wherein the temperature is less than 1000° F., preferably within the range of from about 250° to about 900°F., which can be controlled by controller 60 and suitable valving, e.g., 58. A narrower temperature range of from 350° to 800° F. can be employed in embodiments.

In some embodiments, conditions will call for introducing the CBCRs using modeling techniques, such as computational fluid dynamics, which can be employed to initially determine the optimum locations (zones) to direct treatment chemicals within the boiler and/or ducts. Desirably, best CBCR introduction will achieve essentially full coverage of the CBCRs across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent injectors used. In other words, the zone will preferably be of a depth in the direction of flow sufficient that each of the conical or like spray patterns from nozzles used to introduce the CBCR will overlap with at least one other spray pattern, thereby providing CBCR across the entire cross section of the zone. This three-dimensional section for treatment can be referred to as a defined introduction zone, and the aqueous CBCR will be introduced into this zone under conditions effective for HCl and/or $SO_x$ emissions control. Following this zone (i.e., downstream of it) the combustion gases now having been treated with the CBCR are discharged following sufficient reaction time to reduce the HCl and/or $SO_x$ concentration in the gases.

A monitor for HCl can be positioned before and/or after the introduction zone to determine the effectiveness of the treatment. Monitors following the zone are positioned far enough downstream of the zone to assure time for essentially complete reaction between the pollutant and the CBCR. Residence times of at least one second and preferably from 2 to 5 seconds will usually be effective.

Desirably, the invention will achieve full effect by modeling, e.g., by mechanical modeling or computational fluid dynamics using computer and data input means to identify locations within a combustor for feeding aqueous CBCR and determine the physical form and injection parameters such as pressure, droplet size, droplet momentum and spray pattern for injection means positioned at locations, e.g., via line 56, 56' and/or 56" to nozzle arrays 57, 57' and/or 57", respectively, depending on measured temperatures in the defined zone with introduction controlled by controller 60 and suitable valving, e.g., 58.

Each of the injector locations will typically employ a plurality of nozzles, e.g., in arrays 57 and/or 57', strategically positioned across the cross section at the designated locations to achieve essentially full cross sectional coverage. Note that FIG. 1 shows addition of aqueous CBCR into a suitable portion of the ductwork, e.g., before or after air preheater 26, before or after particulate reducing apparatus 32, where the temperature will be suitable.

The treatment rates of the aqueous CBCR will provide an effective amount of aqueous CBCR to reduce chloride concentrations in the combustion gases by greater than 50%. This can be different from assuring that the HCl content is maintained below about 0.002 pounds per MMBtu (approximately 2 $ppm_v$), which is typically accomplished by the scrubber. The advantage the invention offers in this context is the great reduction in chlorides at feed rates generally of less than 10 pounds per ton of fuel, e.g., from about 1 to 8 pounds per ton, and often from greater than about 1 to about 6 pounds per ton of fuel.

The locations for the nozzles can be determined by computational fluid dynamics, by methodologies taught for example in U.S. Pat. No. 5,740,745 and U.S. Pat. No. 5,894,806, which are hereby incorporated by reference. The concentration of the CBCR and water in the treatment fluid, the nozzle pressure, droplet size, droplet momentum, spray pattern and flow rates can be initially determined by modeling to assure that the proper amount of CBCR is supplied to the correct location in the combustor or downstream equipment in the correct physical form to achieve the desired results of reduced HCl and/or $SO_2$.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing the chloride content in a gas stream to reduce the amount of chlorides in it, comprising: introducing a copper bearing chloride remediator composition in aqueous form into contact with combustion gases within a defined introduction zone under conditions effective for HCl emissions control; and passing the gases from the introduction zone to a particulate recovery device to provide a reduced chloride gas stream.

2. A process according to claim 1, wherein a copper bearing chloride remediator composition will be employed at a dosing rate of less than about 50 pounds per ton of fuel.

3. A process according to claim 2, wherein the copper bearing chloride remediator is employed at a dosing rate of from 1 to 25 pounds per ton of fuel.

4. A process according to claim 1, wherein the copper bearing chloride remediator comprises a copper composition selected from the group consisting of copper carbonate, copper ammonium carbonate, copper ammonium acetate, copper diammonium diacetate, copper ammonium triacetate, copper triammonium acetate, copper tetra ammonium sulfate, copper gluconate (and hydrates thereof), and mixtures of any of these.

5. A process according to claim 1, wherein the copper bearing chloride remediator comprises a member selected from the group consisting of compositions defined by the formula $Cu(NH_3)_x$(carbonate or lower carboxylate)$_y$, wherein the lower carboxylate is selected from the group consisting of formate, acetate and propionate, x is an integer from 0 to 4, y is an integer from 0 to 2, and x+y is equal to or greater than 1.

6. A process according to claim 1, wherein the copper bearing chloride remediator comprises copper ammonium carbonate.

7. A process according to claim 1, wherein the copper bearing chloride remediator comprises an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

8. A process according to claim 1, wherein the copper bearing chloride remediator comprises a member selected from the group consisting of: copper acetylacetonate (and hydrates thereof), copper citrate and hydrates thereof, copper formate and hydrates thereof, copper acetate monohydrate, copper nitrate and hydrates thereof, copper 2,4-pentandionate and hydrates thereof, copper sulfate and hydrates thereof, copper gluconate and hydrates thereof, copper soaps of fatty acids, and mixtures of any of these.

9. A process according to claim 1, wherein the copper bearing chloride remediator comprises copper ammonium carbonate or copper diammonium diacetate.

10. A process according to claim 1, wherein the copper bearing chloride remediator comprises a copper ammonium complex having an empirical formula of $CH_6CuN_2O_3$ or $C_2H_7CuNO_2$.

11. A process according to claim 1, wherein the copper bearing chloride remediator is introduced into a defined zone, wherein the temperature is less than 1000° F.

12. A process according to claim 1, wherein the copper bearing chloride remediator is introduced into a defined zone, wherein the temperature is from 250° to 900° F.

* * * * *